United States Patent
Understein

(10) Patent No.: US 7,165,047 B2
(45) Date of Patent: *Jan. 16, 2007

(54) WEB-BASED ACCOUNT MANAGEMENT FOR HOLD AND RELEASE OF FUNDS

(75) Inventor: Norman Understein, Potomac, MD (US)

(73) Assignee: eDeposit Corporation, Silver Spring, MD (US)

( * ) Notice: Subject to any disclaimer, the term of this patent is extended or adjusted under 35 U.S.C. 154(b) by 185 days.

This patent is subject to a terminal disclaimer.

(21) Appl. No.: 10/414,281

(22) Filed: Apr. 16, 2003

(65) Prior Publication Data

US 2003/0225678 A1 Dec. 4, 2003

Related U.S. Application Data

(63) Continuation of application No. 09/567,589, filed on May 10, 2000.

(60) Provisional application No. 60/133,687, filed on May 10, 1999.

(51) Int. Cl.
 *G06Q 40/00* (2006.01)
(52) U.S. Cl. .............................. 705/37; 705/1; 705/26; 705/40; 705/76
(58) Field of Classification Search ................. 705/40, 705/35, 37, 1, 36, 26, 76; 379/114.01; 273/256
 See application file for complete search history.

(56) References Cited

U.S. PATENT DOCUMENTS

| | | | |
|---|---|---|---|
| 5,794,207 A | * | 8/1998 | Walker et al. ................. 705/1 |
| 5,872,844 A | | 2/1999 | Yacobi |
| 6,023,686 A | | 2/2000 | Brown |
| 6,032,133 A | | 2/2000 | Hilt et al. |
| 6,055,518 A | | 4/2000 | Franklin et al. |
| 6,076,074 A | | 6/2000 | Cotton et al. |
| 6,078,906 A | | 6/2000 | Huberman |

(Continued)

FOREIGN PATENT DOCUMENTS

WO  WO 00/058885 A2 * 10/2000

OTHER PUBLICATIONS

Crowe, Apr. 1994 "Bidding on PCS Licenses", Cellular Business v1ln4 pp. 40-50.*

(Continued)

*Primary Examiner*—Ella Colbert
*Assistant Examiner*—Harish T. Dass
(74) *Attorney, Agent, or Firm*—Nixon & Vanderhye P.C.

(57) ABSTRACT

A system and method for qualifying a bidder over a global network for an auction helps to significantly reduce or eliminate commerce fraud. An auction site, for example, enlists the system to maintain bidder funding accounts for prospective bidders. When a bid is placed, the funds are reserved in the bidder's bidder funding account including funds for a deposit if required. In the event that a bidder is not the high bidder, the reserved funds are released. At completion of the auction, the funds may be transferred from the winning bidder's bidder funding account to the seller, and the bid holds are released. A balance in the bidder funding account can be established according to funds deposited in the account in an interest-bearing account or via a line of credit issued from a bank card issuing company or the like.

17 Claims, 4 Drawing Sheets

U.S. PATENT DOCUMENTS

| | | | |
|---|---|---|---|
| 6,085,176 A * | 7/2000 | Woolston | 705/37 |
| 6,098,053 A | 8/2000 | Slater | |
| 6,105,007 A | 8/2000 | Norris | |
| 6,122,625 A | 9/2000 | Rosen | |
| 6,134,534 A | 10/2000 | Walker et al. | |
| 6,182,052 B1 | 1/2001 | Fulton et al. | |
| 6,240,396 B1 | 5/2001 | Walker et al. | |
| 6,260,024 B1 | 7/2001 | Shkedy | |
| 6,285,989 B1 | 9/2001 | Shoham | |
| 6,490,568 B1 | 12/2002 | O'Mara et al. | |

OTHER PUBLICATIONS

Newsbytes PM, Oct. 14, 1998 "Domain ".tv" For Television, But At A Price Oct. 14, 1998".*

Ilyce R. Glink, Aug. 28, 1994 "Escrow Has 3 Different Meanings in Real Estate", Chicago Sun—Times. Chicago, Ill. Aug. 28, 1994.: p. 9 [ProQuest document ID: 117585982 URL: http://proquest.umi.com/pqdweb?did=117585982&sid=4&Fmt=7& clientId=19649 &RQT=309&VNa.*

* cited by examiner

WEB-BASED ACCOUNT MANAGEMENT FOR HOLD AND RELEASE OF FUNDS

This application is a continuation of U.S. patent application Ser. No. 09/567,589, filed May 10, 2000, which claims the benefit of U.S. Provisional Patent Application Ser. No. 60/133,687, filed May 10, 1999, the entire content of which is herein incorporated by reference.

BACKGROUND OF THE INVENTION

The present invention relates to an account management system for Internet commerce applications and, more particularly, to a system for qualifying over the Internet a participant in a transaction.

An unfortunate result of the increasing market in electronic commerce over the Internet is the increasing occurrences of fraud and/or abuse. Such abuse has been particularly evident on Internet auction sites, of which there are over 1,000 currently operating today. A majority of the abuse has been either individuals bidding on items for sale without the intention of ever taking possession of the items or individuals who intentionally bid on items with the intention of taking possession of the items without paying for them.

It would thus be desirable to provide an intermediary or third-party participant that can provide an Internet account/credit management system to eliminate the potential for fraud or abuse. Such a system should be able to determine with some certainty that the individual who has registered on the site has funds available, which can be reserved as a deposit for the item or to cover the cost of the item if the bidder submits a winning bid. It would also be desirable for the system to enable funds to be transferred between bidder and seller accounts at settlement.

SUMMARY OF THE INVENTION

The system according to the present invention enables an auction company to provide a secure way of preventing fraudulent bidding and preventing participation by bidders that fail to settle after winning an auction. The system is preferably an Internet web site that serves to electronically transact the acceptance and verification of deposits from multiple auctions or transactions and participants simultaneously. The system provides an easy to use and efficient method for minimizing fraudulent bidding in multiple auctions simultaneously while being capable of providing insured (such as FDIC) interest bearing deposits held for bidders. The system incorporates a secure web site capable of communicating with numerous auction entities and tracking multiple deposit accounts for participants in a commerce environment simultaneously.

Participants are required to establish a deposit or margin account, a so-called bidder funding account, prior to their being able to bid. When the bidder places a bid, the auction venue computer queries the system to determine whether the bidder has an account. If not, the bidder is provided an opportunity to sign up for an account.

When listing an asset for sale, a seller is prompted to indicate whether a bid deposit is required, and if so, the amount of the required deposit. The sellers or the auction venue determine the amount of the deposit according to various factors, including the fact that higher deposit amounts result in a smaller number of qualified bidders, but also result in more qualified bidders. Moreover, the seller or the auction venue considers what amount of money would adequately compensate the seller in the event that the bidder does not complete settlement. A suggested deposit amount may also be calculated automatically.

If a deposit is required to participate in the auction, the auction venue transmits information to the deposit system relating to the amount of a required deposit. The system then puts a deposit hold on the bidder's bidder funding account for the amount of that auction's deposit.

During the auction, if the bidder is a high bidder, the amount of the actual bid is alternatively or additionally held or reserved in the bidder's bidder funding account. The deposit hold or bid hold is only in place as long as the bidder is the high bidder. The holds are released in the event that the bidder is no longer the high bidder. Each time the bidder is a high bidder in a particular auction, a deposit hold is placed on the bidder's bidder funding account along with the bid hold, allowing the bidder the ability to bid on multiple auctions requiring deposit holds simultaneously up to the available balance of the bidder funding account. Preferably, the bidder's deposit holds cannot exceed a balance in the bidder's bidder funding account.

In accordance with an exemplary embodiment of the invention, a method of qualifying a bidder over a global network for an auction includes the steps of (a) establishing a bidder funding account, (b) reserving a portion of the bidder funding account according to a bid submitted by the bidder, and (c) releasing the reserved portion of the bidder funding account if the bid is not a high bid. Step (b) may be practiced by reserving an amount of the bidder funding account corresponding to the bid submitted by the bidder. In this context, the method may further include transferring the reserved portion when settlement is complete. Subsequently, the method may include releasing the reserved portion of the bidder funding account.

The amount reserved may correspond to a deposit amount required by the seller or the auction venue. In this context, step (b) may be further practiced by reserving an amount of the bidder funding account corresponding to the bid submitted by the bidder in addition to the deposit amount. The deposit amount may be transferred to the seller if the bid is a winning bid and the bidder does not complete settlement.

In one mode of operation, the step of establishing a bidder funding account includes depositing funds in the bidder funding account. In this context, step (a) may be further practiced by paying interest on the funds deposited in the bidder funding account. Alternatively, the step of establishing a bidder funding account may be practiced by establishing a line of available credit.

If after step (c), the bidder resubmits a bid, the system preferably repeats step (b) by reserving a portion of the bidder funding account according to the bid submitted by the bidder.

In accordance with another exemplary embodiment of the invention, a method of qualifying a bidder over a global network for an auction includes the steps of (a) determining whether a deposit is required to participate in the auction, and if so, determining an amount of the deposit; (b) receiving a bid inquiry from the bidder and determining whether the bidder has established a bidder funding account, wherein (b1) if the bidder has not established the bidder funding account, enabling the bidder to establish the bidder funding account, and (b2) if the bidder has established the bidder funding account, accessing the bidder's bidder funding account; and (c) qualifying the bidder according to a balance in the bidder funding account.

If a deposit is required according to step (a), step (c) is practiced by reserving a first portion of the bidder funding account corresponding to an amount of the deposit. Step (c)

is preferably further practiced by reserving a second portion of the bidder funding account corresponding to an amount of the bid. In this context, the method includes transferring at least the second portion when settlement is complete and releasing the reserved first and second portions of the bidder funding account. If a deposit is required according to step (a), step (c) may be further practiced by transferring the first portion of the bidder funding account if the bid inquiry becomes a winning bid and the bidder does not complete settlement.

Step (c) may be practiced by qualifying the bidder according to an amount of unreserved funds deposited in the bidder funding account. Alternatively, step (c) may be practiced by qualifying the bidder according to an amount of unreserved credit in the bidder funding account.

In accordance with still another exemplary embodiment of the invention, a computer system for effecting qualifying of a bidder in an auction is provided. The computer system includes at least one user computer running a computer program that requests information according to a bid inquiry input by a bidder. The computer system also includes a system server running a server program, wherein the at least one user computer and the system server are interconnected by a computer network. The system server determines whether the bidder has established a bidder funding account. If the bidder has not established the bidder funding account, the system server sends information to enable the bidder to establish the bidder funding account. If the bidder has established the bidder funding account, the system server accesses the bidder's bidder funding account and qualifies the bidder according to a balance in the bidder funding account.

In accordance with still another exemplary embodiment of the invention, a computer program embodied on a computer-readable medium is provided for qualifying a bidder over a global network for an auction.

BRIEF DESCRIPTION OF THE DRAWINGS

These and other aspects and advantages of the present invention will be described in detail with reference to the accompanying drawings, in which.

DETAILED DESCRIPTION OF PREFERRED EMBODIMENTS

Figure 2:
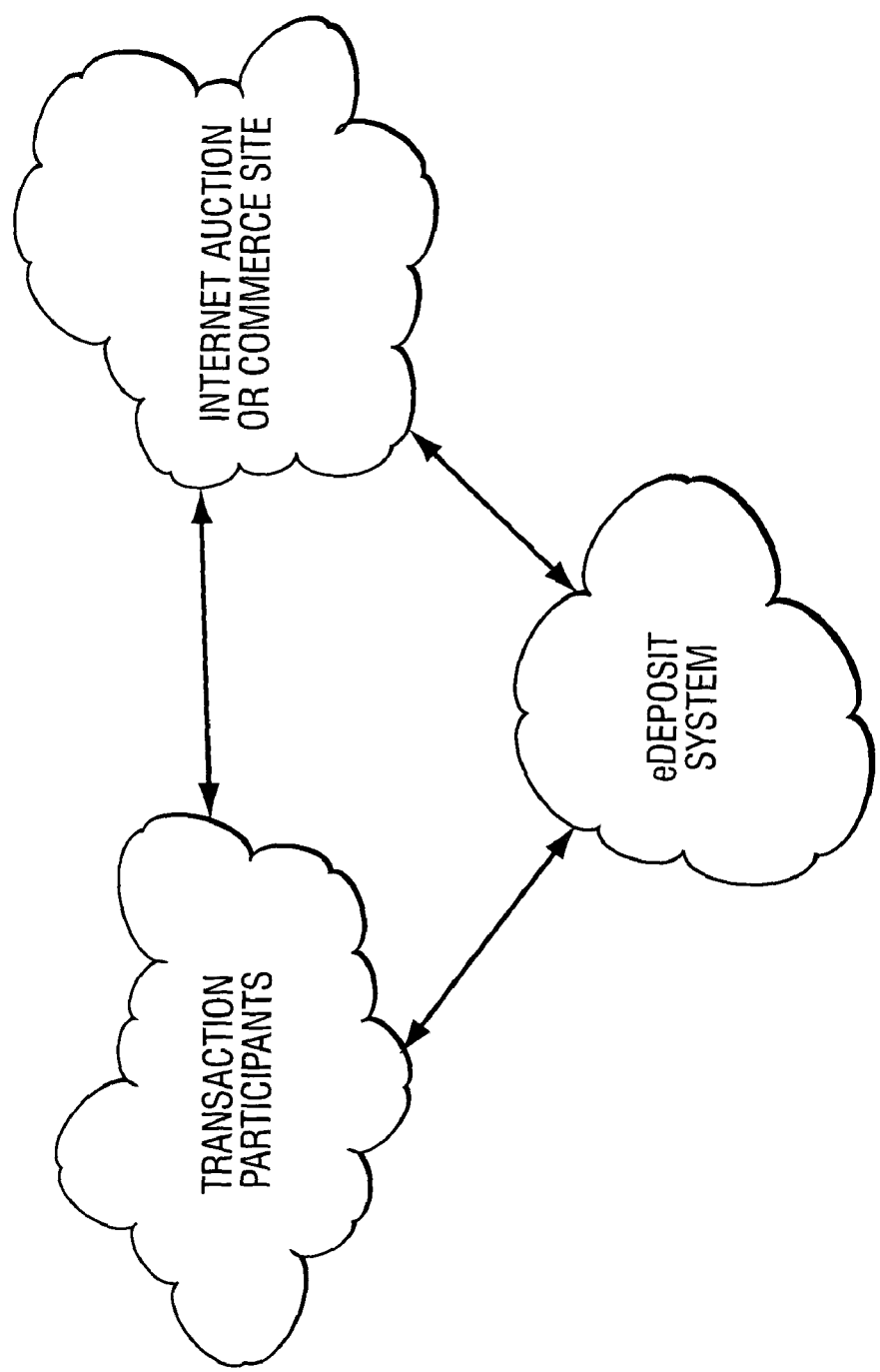
FIG. 2 illustrates the system environment and application.
Figure 3:
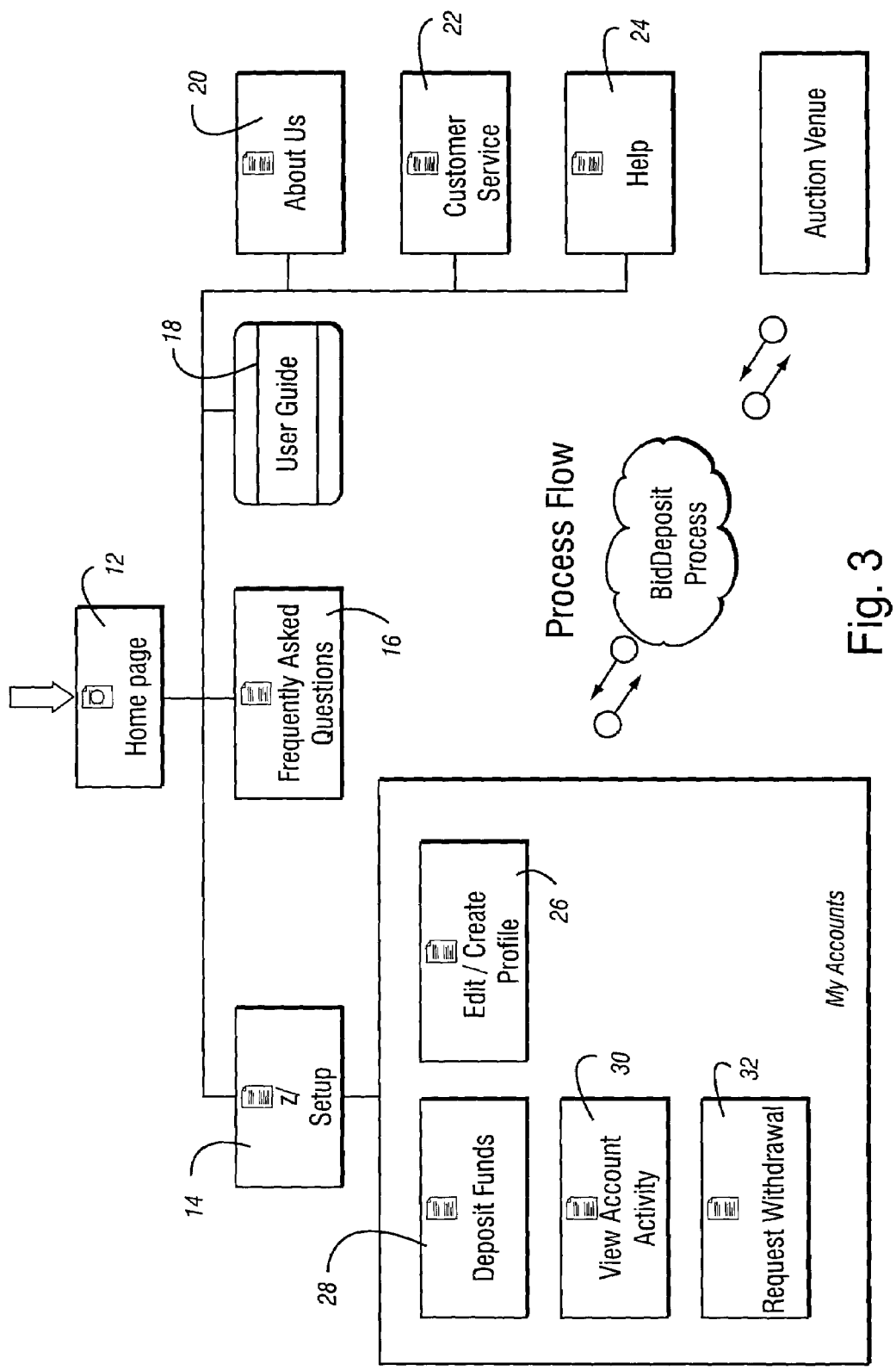
FIG. 3 illustrates the site architecture according to the present invention.
Figure 4:
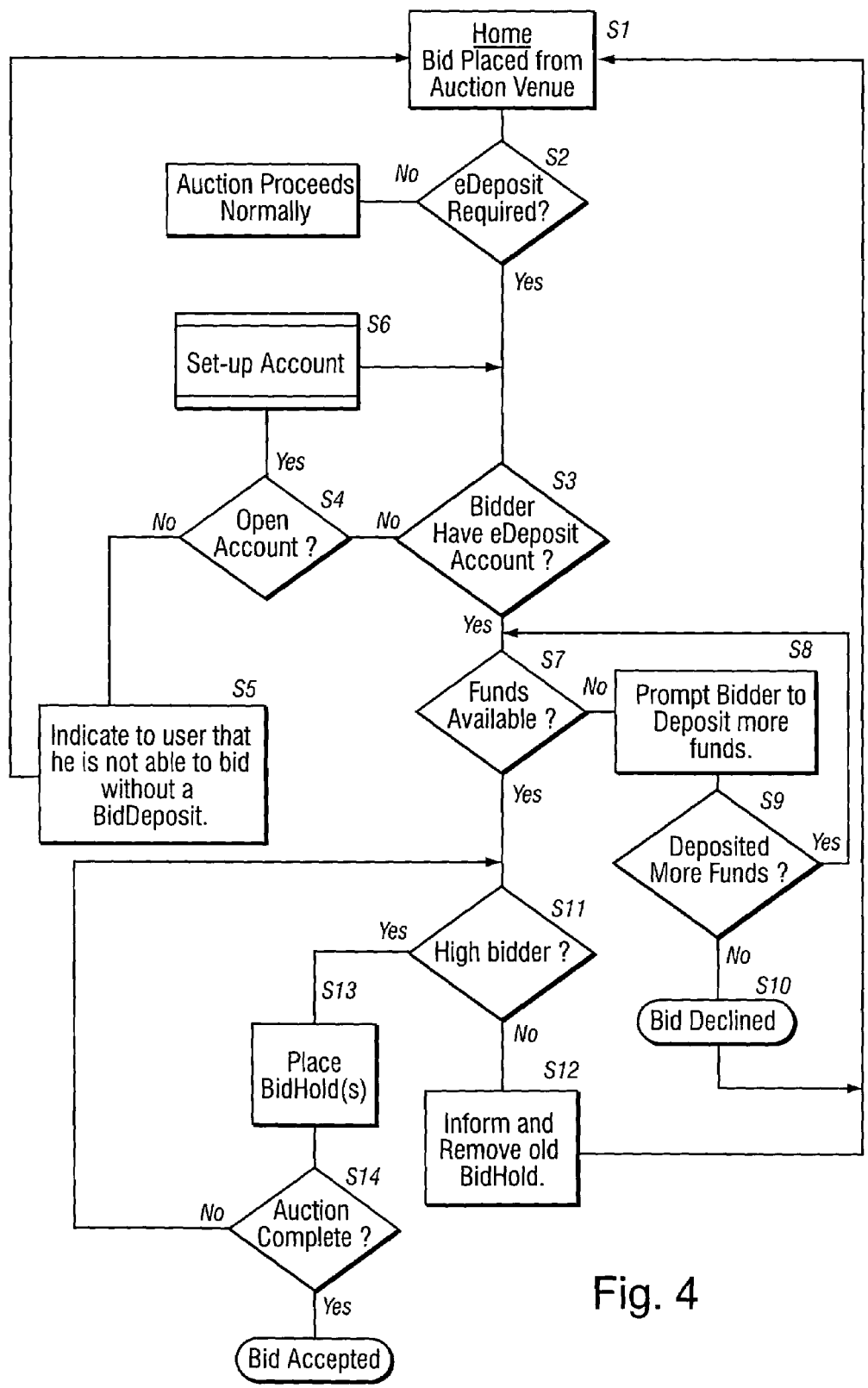
FIG. 4 is a flow diagram illustrating an auction process incorporating the system of the present invention.

The account management system implemented in the diagrams of FIGS. 2–4 is preferably a browser-based system in which a program running on a user's computer (the user's web browser) requests information from a server program running on a system server. The system server sends the requested data back to the browser program and the browser program then interprets and displays the data on the user's computer screen. The process is as follows:

1. The user runs a web browser program on his/her computer.

2. The user connects to the server computer (e.g., via the Internet). Connection to the server computer may be conditioned upon the correct entry of a password as is well known.

3. The user requests a page from the server computer. The user's browser sends a message to the server computer that includes the following:
   the transfer protocol (e.g., http://); and
   the address, or Uniform Resource Locator (URL).

4. The server computer receives the user's request and retrieves the requested page, which is composed, for example, in HTML (Hypertext Markup Language).

5. The server then transmits the requested page to the user's computer.

6. The user's browser program receives the HTML text and displays its interpretation of the requested page.

Thus, the browser program on the user's computer sends requests and receives the data needed to display the HTML page on the user's computer screen. This includes the HTML file itself plus any graphic, sound and/or video files mentioned in it. Once the data is retrieved, the browser formats the data and displays the data on the user's computer screen. Helper applications, plug-ins, and enhancements such as Java™ enable the browser, among other things, to play sound and/or display video inserted in the HTML file. The fonts installed on the user's computer and the display preferences in the browser used by the user determine how the text is formatted.

If the user has requested an action that requires running a program (e.g., a search), the server loads and runs the program. This process usually creates a custom HTML page "on the fly" that contains the results of the program's action (e.g., the search results), and then sends those results back to the browser.

Browser programs suitable for use in connection with the account management system of the present invention include Netscape® Navigator available from Netscape® Communications Corporation and Internet Explorer available from Microsoft® Corp.

While the above description contemplates that each user has a computer running a web browser, it will be appreciated that more than one user could use a particular computer terminal or that a "kiosk" at a central location (e.g., a cafeteria, a break area, etc.) with access to the system server could be provided.

It will be recognized by those in the art that various tools are readily available to create web pages for accessing data stored on a server and that such tools may be used to develop and implement the account management system described below and illustrated in the accompanying drawings.

Figure 1:
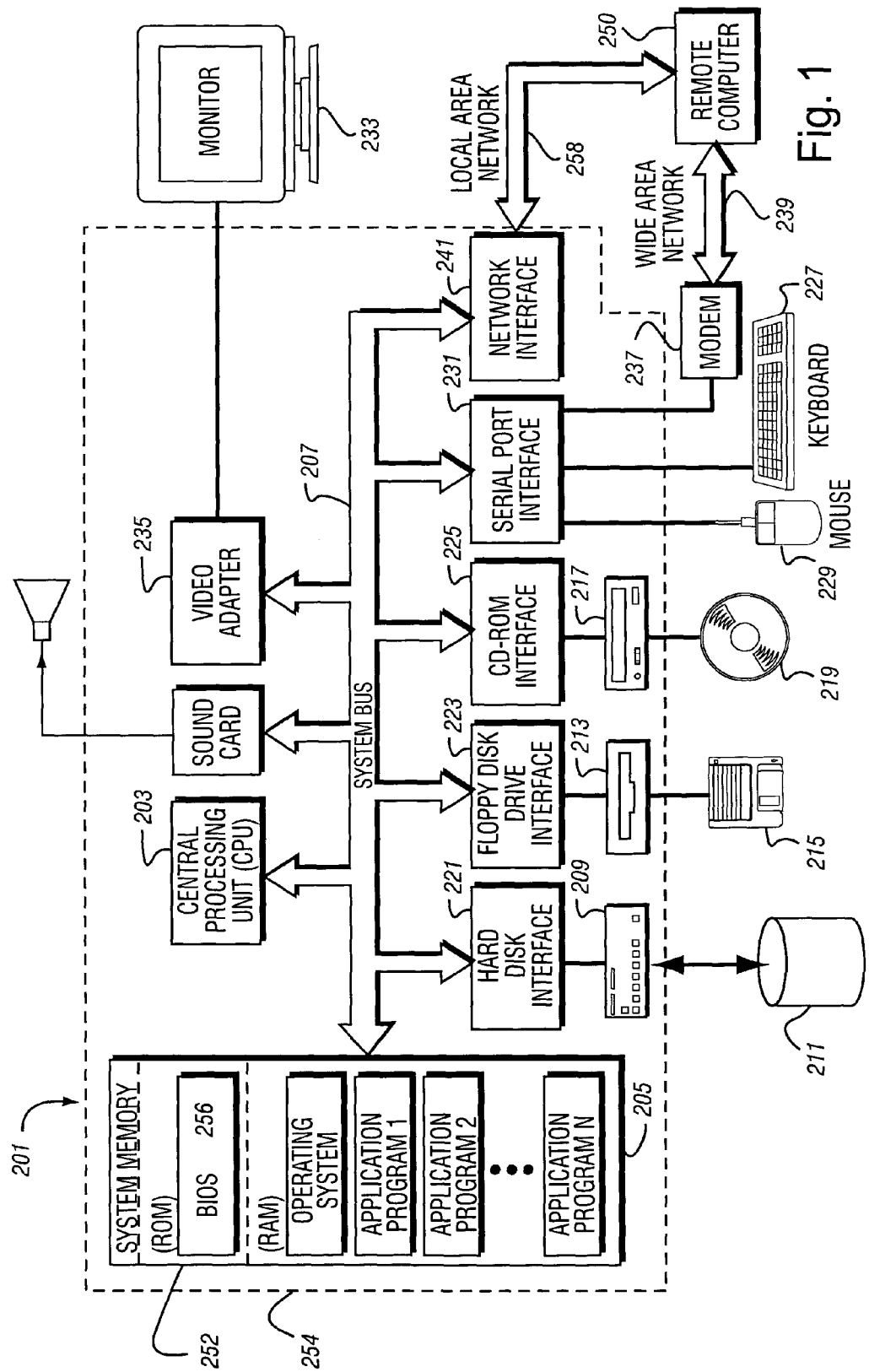
FIG. 1 is a detailed schematic illustration of a computer system.

FIG. 1 generally illustrates a computer system 201 suitable for use as the client and server components of the account management system. It will be appreciated that the client and server computers will run appropriate software and that the client and server computers may be somewhat differently configured with respect to the processing power of their respective processors and with respect to the amount of memory used. Computer system 201 includes a processing unit 203 and a system memory 205. A system bus 207 couples various system components including system memory 205 to processing unit 203. System bus 207 may be any of several types of bus structures including a memory bus or memory controller, a peripheral bus, and a local bus using any of a variety of bus architectures. System memory 205 includes read only memory (ROM) 252 and random access memory (RAM) 254. A basic input/output system (BIOS) 256, containing the basic routines that help to transfer information between elements within computer system 201, such as during start-up, is stored in ROM 252. Computer system 201 further includes various drives and associated computer-readable media. A hard disk drive 209 reads from and writes to a (typically fixed) magnetic hard disk 211; a magnetic disk drive 213 reads from and writes to a removable "floppy" or other magnetic disk 215; and an optical disk drive 217 reads from and, in some configurations, writes to a removable optical disk 219 such as a CD ROM or other optical media. Hard disk drive 209, magnetic disk drive 213, and optical disk drive 217 are connected to system bus 207 by a hard disk drive interface 221, a magnetic disk drive interface 223, and an optical drive interface 225, respectively. The drives and their associated computer-readable media provide nonvolatile storage of computer-readable instructions, SQL-based procedures, data structures, program modules, and other data for computer system 201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules may be stored on the hard disk 211, removable magnetic disk 215, optical disk 219 and/or ROM 252 and/or RAM 254 of the system memory 205. Such program modules may include an operating system providing graphics and sound APIs, one or more application programs, other program modules, and program data. A user may enter commands and information into computer system 201 through input devices such as a keyboard 227 and a pointing device 229. Other input devices may include a microphone, joystick, game controller, satellite dish, scanner, or the like. These and other input devices are often connected to the processing unit 203 through a serial port interface 231 that is coupled to the system bus 207, but may be connected by other interfaces, such as a parallel port interface or a universal serial bus (USB). A monitor 233 or other type of display device is also connected to system bus 207 via an interface, such as a video adapter 235.

The computer system 201 may also include a modem 237 or other means for establishing communications over the wide area network 239, such as the Internet. The modem 237, which may be internal or external, is connected to the system bus 207 via the serial port interface 231. A network interface 241 may also be provided for allowing the computer system 201 to communicate with a remote computing device 250 via a local area network 258 (or such communication may be via the wide area network 239 or other communications path such as dial-up or other communications means). The computer system 201 will typically include other peripheral output devices, such as printers and other standard peripheral devices.

As will be understood by those familiar with web-based forms and screens, users may make menu selections by pointing-and-clicking using a mouse, trackball or other pointing device, or by using the TAB and ENTER keys on a keyboard. For example, menu selections may be highlighted by positioning the cursor on the selections using a mouse or by using the TAB key. The mouse may be left-clicked to select the selection or the ENTER key may be pressed. Other selection mechanisms including voice-recognition systems, touch-sensitive screens, etc. may be used and the invention is not limited in this respect.

The site architecture and system method will be described with reference to FIGS. 2–4. Generally, an auction company or Internet auction venue can implement the system according to the present invention to require its users (i.e., bidders and sellers) to establish a management account, a so-called bidder funding account, and process all auctions through the system according to the present invention. As shown in FIG. 2, the eDEPOSIT™ system of the invention serves as an intermediary between sellers and bidders participating in an auction over the Internet, and between the Internet auction site and the participants (sellers and bidders) in an auction. The system establishes and maintains bidder funding accounts to ensure sellers that bidder funds are available for any required deposits and bid amounts. The Internet auction site enlists the system to require bidders to maintain a bidder funding account, and the system tracks each bid of every auction simultaneously.

The process of establishing an account will be described with reference to FIG. 3. At the system home page 12, the user can access a login/set-up area 14, a Frequently Asked Questions area 16, a User Guide 18, or an informational area including company information 20, Customer Service 22 and a Help area 24.

Account maintenance and set-up are effected via the link at 14. To establish an account, the user is prompted to complete a registration form via a link 26. The registration form will include personal and financial information about the user including, for example, name, address, phone number, e-mail address, social security number, etc. Once completed, the user selects a user ID and password and is assigned an account number. The link 26 can also be accessed to enable the user to edit the user profile.

The user can deposit funds via a link 28 by any suitable means, including cashier's/certified check, online check, virtual check, credit card payment, bank wire, e-mail or the like. Funds are deposited into a system server bank account (such as an insured account) and tracked through the server database. Users can track and monitor their account at any time via a link 30 to determine an amount of interest earned or the status of holds on the account. All such holds or reservations are effected via the system computer and do not affect the interest rates for each account. Bidders may deposit or withdraw their money at any time but may only withdraw up to the non-held amounts in the account. Withdrawal requests are made via a link 32. Bidders may also have the option of designating funds for certificates of deposits, where they agree to keep their funds in the account for a specified period of time for specific rates of return.

A balance in the bidder funding account can be an amount of unreserved funds deposited in the bidder funding account and/or an amount of unreserved credit in the bidder funding account according to an approved line of credit provided to the user. In this context, portions of a credit line are reserved via an "authorization hold," which is enabled according to known credit card-type issuers and processors. The authorization hold may draw on the credit line when an auction is complete or, when a deposit is required, when the bidder does not complete settlement after being a high bidder. The authorization hold serves to reserve a portion of the credit line. When the bidder is no longer the high bidder, the authorization hold is released. The authorization hold can also act as an escrow service to hold transfer of funds until the items ordered have been accepted or delivered to the bidder.

The line of credit function can be effected via a bank card issuing company that currently provides credit such as through the Internet or by the system source. The system, through a link with the bank card issuing company, can determine if the credit line is sufficient to place an authorization hold on the line of credit and to reverse the authorization hold when the line of credit is not needed. An auction venue (or other business that requires a deposit) will identify the system according to the invention as a provider of a credit facility to qualify registered bidders to enable the bidder to leave a deposit when the selling party in an auction transaction requires one.

Registered bidders apply for the credit facility just as they would apply for a credit card, but through the bank card issuing companies. Just as with applying for a credit card, the applicant may request a line of credit, and the issuing company, based on the credit-worthiness of the applicant, can either issue that line of credit or reject the requested line of credit and issue either a lesser amount or none at all. The credit line determination can be immediate, and if accepted, the registered bidder would immediately receive an identification number with or without an actual system credit card.

If the registered bidder bids on an item requiring a deposit, the bidder is prompted to enter an identification number at the participating auction site, and through the system, it is determined if the deposit amount is available on the bidder's credit line. If so, the system requests an authorization hold on their credit line. If the bidder is not the high bidder, the authorization hold is released. If the bidder wins the auction, the funds can be transferred through the bank card issuing company and charged to the bidder according to a user agreement or according to another preset billing procedure.

An auction process including an implementation of the present invention will be described with reference to FIG. 4. Although the invention is described in accordance with an application to an auction process, the system could readily be implemented into any transaction where qualification is desirable. Thus, the term "auction" as used herein means any transaction between parties where qualification of one or more of the parties is desirable. In this context, the term "bidder" as used herein refers to any participant in the transaction that is being qualified with the system according to the invention, including, but not limited to, buyers, sellers, vendors, service providers, and the like.

A bid is initially placed by a bidder at an auction venue in step S1. If the auction venue does not incorporate the system according to the present invention (NO in step S2), the auction proceeds normally as is conventional, subject to potential fraud or abuse. If the auction venue has implemented the system according to the present invention (YES in step S2), the system determines in step S3 whether the bidder has a bidder funding account. If not (NO in step S3), the user is given an opportunity to open an account in step S4. If the user does not desire to open an account (NO in step S4), the user is provided with an indication that bids cannot be made at this venue without a bidder funding account (step S5), and the user is returned to the auction venue home page at step S1. If the user desires to open an account (YES in step S4), the user is directed to the system home page 12 where account information can be gathered and an account can be established as described above with reference to FIG. 3 (step S6). The system then returns the user to step S3 to determine whether the user has a valid account.

If the user has successfully established a bidder funding account or the user had previously established an account (YES in step S3), in step S7, the system determines whether sufficient funds are available to proceed with the auction in step S7. In the event that sufficient funds are not available (NO in step S7), an indication is provided to the user, and the user is prompted to deposit more funds in their bidder funding account (step S8). The funds may be deposited by cashier's/certified check, online check, virtual check, credit card payment, bank wire, e-mail or any other suitable vehicle. If additional funds are not deposited (NO in step S9), the bid is declined at step S10, and the system returns the user to the auction venue home page at step S1. If additional funds are deposited (YES in step S9), the system returns the user to step S7 to determine if sufficient funds are available.

If sufficient funds are available for the user's bid and any required deposit (YES in step S7), the system determines whether the user is a high bidder in step S11. If not (NO in step S11), the user is informed that they are not the high bidder, and any existing bid holds or deposit holds are removed (step S12). The system then returns the user to the auction home page at step S1 to place another bid. If the user is the high bidder (YES in step S11), a hold is placed in the bidder's bidder funding account in step S13. That is, if a deposit is required to participate in the auction, a first portion of the bidder's bidder funding account is reserved corresponding to an amount of the deposit. In one operating mode, a second portion of the bidder's bidder funding account is also reserved corresponding to an amount of the bid. If no deposit is required to participate in the respective auction, only the second portion of the bidder funding account is reserved.

In step S14, it is determined whether the auction is complete, and if so (YES in step S14), the user's bid is accepted. If the auction is not complete (NO in step S14), the system returns to step S11 to determine whether the user remains the high bidder until the auction is complete.

When the auction is complete, the bidder may direct the reserved funds from the bidder's bidder funding account according to the seller's specified instructions, enabling the seller to immediately deliver the product or otherwise effect settlement. Alternatively, the bidder can effect settlement using funds separate from the bidder funding account, although delivery or the like in that instance may be delayed until the seller receives payment. In either instance, when settlement is complete, the reserved funds in the bidder's bidder funding account are released.

Failed transactions can be handled in any suitable manner, depending on the party at fault, the reason for the failed transaction, etc. In the event that the bidder is at fault, if a deposit was required to participate in the auction, the bidder typically forfeits the deposit. Since the amount of the deposit is reserved in the bidder's account, this amount can be transferred from the bidder funding account to the seller or otherwise. The system may require the seller to notify the system that the transaction did not settle and demand forfeiture of the deposit. Once the seller demand has been received, the bidder is notified and given an opportunity to protest the demand. If no protest is received, the system transfers the held funds to the seller. If a protest is received, the seller and bidder are provided an opportunity to resolve the dispute, for example, by arbitration or the like. A similar procedure can be used in the event of seller fault. That is, sellers may also be required to maintain "bidder funding accounts" with seller deposits being reserved during the transaction. If a seller is at fault in a failed transaction, the seller may forfeit the deposit. The deposit hold and the bid hold remain in place, however, until either the transaction is complete or until the dispute is otherwise resolved.

The system according to the invention exploits the impartiality of the Internet, providing an objective intermediary between transaction participants to ensure, for example, that bidders are qualified to participate in an auction. The account maintenance is also suitable for online transactions such as retail consumer products and the like and off-line transactions, for example, transactions requiring a deposit or other financial qualification. By ensuring that funds are available, the system according to the invention significantly reduces or eliminates fraud and abuse in e-commerce transactions.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of qualifying a bidder via a computer system over a global network for an auction, the method comprising:
   (a) establishing a bidder funding account by depositing funds in the bidder funding account;
   (b) the computer system reserving a portion of the deposited funds in the bidder funding account according to a bid submitted by the bidder to participate in the auction; and
   (c) the computer system releasing the reserved portion of the bidder funding account during the auction if the bid is not a high bid, wherein if after step (c), the bidder submits a new bid, the method further comprises repeating step (b).

2. A method according to claim 1, wherein step (b) comprises reserving an amount of the bidder funding account corresponding to the bid submitted by the bidder.

3. A method according to claim 2, further comprising transferring an amount corresponding to the reserved portion when settlement is complete.

4. A method according to claim 3, further comprising releasing the reserved portion of the bidder funding account after transferring the amount corresponding to the reserved portion of the bidder funding account.

5. A method according to claim 1, wherein step (b) comprises reserving an amount of the bidder funding account corresponding to a deposit amount required by a seller.

6. A method according to claim 5, wherein step (b) further comprises reserving an amount of the bidder funding account corresponding to the bid submitted by the bidder in addition to the deposit amount.

7. A method according to claim 5, further comprising transferring the deposit amount if the bid is a winning bid and the bidder does not complete settlement.

8. A method according to claim 1, wherein step (a) further comprises paying interest on the funds deposited in the bidder funding account.

9. A method of qualifying a bidder via a computer system over a global network for an auction, the method comprising:
   (a) determining whether a deposit is required to participate in the auction, and if so, determining an amount of the deposit;
   (b) receiving a bid inquiry over the global network from the bidder and determining whether the bidder has established a bidder funding account, wherein
      (b1) if the bidder has not established the bidder funding account, enabling the bidder to establish the bidder funding account, and
      (b2) if the bidder has established the bidder funding account, the computer system accessing the bidder's bidder funding account; and
   (c) the computer system qualifying the bidder according to a balance in the bidder funding account by
      (c1) reserving a portion of the balance based on the bid inquiry,
      (c2) releasing the reserved portion during the auction if the bid inquiry is not a high bid, and
      (c3) repeating step (c) if after step (c2) the bidder submits a new bid inquiry.

10. A method according to claim 9, wherein if a deposit is required according to step (a), step (c1) comprises reserving a first portion of the bidder funding account corresponding to an amount of the deposit.

11. A method according to claim 10, wherein step (c1) further comprises reserving a second portion of the bidder funding account corresponding to an amount of the bid.

12. A method according to claim 10, wherein if a deposit is required according to step (a), step (c) further comprises transferring the first portion of the bidder funding account if the bid inquiry becomes a winning bid and the bidder does not complete settlement.

13. A method according to claim 9, wherein step (c) comprises qualifying the bidder according to an amount of unreserved funds deposited in the bidder funding account.

14. A method according to claim 9, wherein step (c) comprises qualifying the bidder according to an amount of unreserved credit in the bidder funding account.

15. A computer system for effecting qualifying of a bidder in an auction, the computer system comprising: at least one user computer running a computer program that requests information according to a bid inquiry input by a bidder; and
   a system server running a server program, the at least one user computer and the system server being interconnected by a computer network, the system server determining whether the bidder has established a bidder funding account, wherein (1) if the bidder has not established the bidder funding account, the system server sending information to enable the bidder to establish the bidder funding account, and (2) if the bidder has established the bidder funding account, the system server accessing the bidder's bidder funding account and qualifying the bidder according to a balance in the bidder funding account by (i) reserving a portion of the balance based on the bid inquiry, (ii) releasing the reserved portion during the auction if the bid inquiry is not a high bid, and (iii) repeating qualifying the bidder if after (ii) the bidder submits a new bid inquiry.

16. A computer program embodied on a computer-readable medium for qualifying a bidder over a global network for an auction, the computer program comprising:
   means for establishing a bidder funding account by depositing funds in the bidder funding account;
   means for reserving a portion of the deposited funds in the bidder funding account according to a bid submitted by the bidder; and
   means for releasing the reserved portion of the bidder funding account during the auction if the bid is not a high bid, wherein if the bidder submits a new bid, the reserving means re-reserving a portion of the bidder funding account according to the new bid.

17. A computer program embodied on a computer-readable medium for qualifying a bidder over a global network for an auction, the computer program comprising:
   means for determining whether a deposit is required to participate in the auction, and if so, for determining an amount of the deposit;

means for receiving a bid inquiry from the bidder and for determining whether the bidder has established a bidder funding account, wherein
  (1) if the bidder has not established the bidder funding account, the program comprising means for enabling the bidder to establish the bidder funding account, and
  (2) if the bidder has established the bidder funding account, the program comprising means for accessing the bidder's bidder funding account; and means for qualifying the bidder according to a balance in the bidder funding account by (i) reserving a portion of the balance based on the bid inquiry, (ii) releasing the reserved portion during the auction if the bid inquiry is not a high bid, and (iii) repeating qualifying the bidder if after (ii) the bidder submits a new bid inquiry.

* * * * *